United States Patent [19]
Hollaar

[11] Patent Number: 5,396,613
[45] Date of Patent: Mar. 7, 1995

[54] METHOD AND SYSTEM FOR ERROR RECOVERY FOR CASCADED SERVERS

[75] Inventor: Lee A. Hollaar, Salt Lake City, Utah
[73] Assignee: University of Utah Research Foundation
[21] Appl. No.: 980,165
[22] Filed: Nov. 5, 1992
[51] Int. Cl.$^6$ ............................................. G06F 11/00
[52] U.S. Cl. .................................................. 395/575
[58] Field of Search ................ 395/575; 371/62; 364/945, 266.5

[56] References Cited

U.S. PATENT DOCUMENTS

| | | | |
|---|---|---|---|
| 4,766,596 | 8/1988 | Michels-Krohn et al. | 371/62 |
| 4,800,488 | 1/1989 | Agrawal et al. | 364/200 |
| 4,866,707 | 9/1989 | Marshall et al. | 370/94.1 |

Primary Examiner—Robert W. Beausoliel, Jr.
Assistant Examiner—Stephen C. Elmore
Attorney, Agent, or Firm—Jon C. Christiansen; Lee A. Hollaar; Daniel P. McCarthy

[57] ABSTRACT

An improved method for error recovery in client-server distributed processing systems using cascaded servers. The method adds an additional form of acknowledgement message from a server to its predecessor. This message is sent when the server has completed all its processing and has received an ACK message from its successor, indicating that its result has been successfully received by the successor. The predecessor server retains a copy of its results until it receives the done message, at which time the copy of the results is discarded. If a done message is not received by the time a timer has expired, indicating that a problem has occurred with a server or its communications, the predecessor server resends its stored results.

30 Claims, 8 Drawing Sheets

METHOD AND SYSTEM FOR ERROR RECOVERY FOR CASCADED SERVERS

BACKGROUND OF THE INVENTION

1. Field of the Invention

The present invention pertains to the field of digital data communications and client-server distributed data processing systems and in particular techniques for the recovery of faults caused by either a communications problem or the failure of a client process.

2. Description of the Related Art

Figure 1:
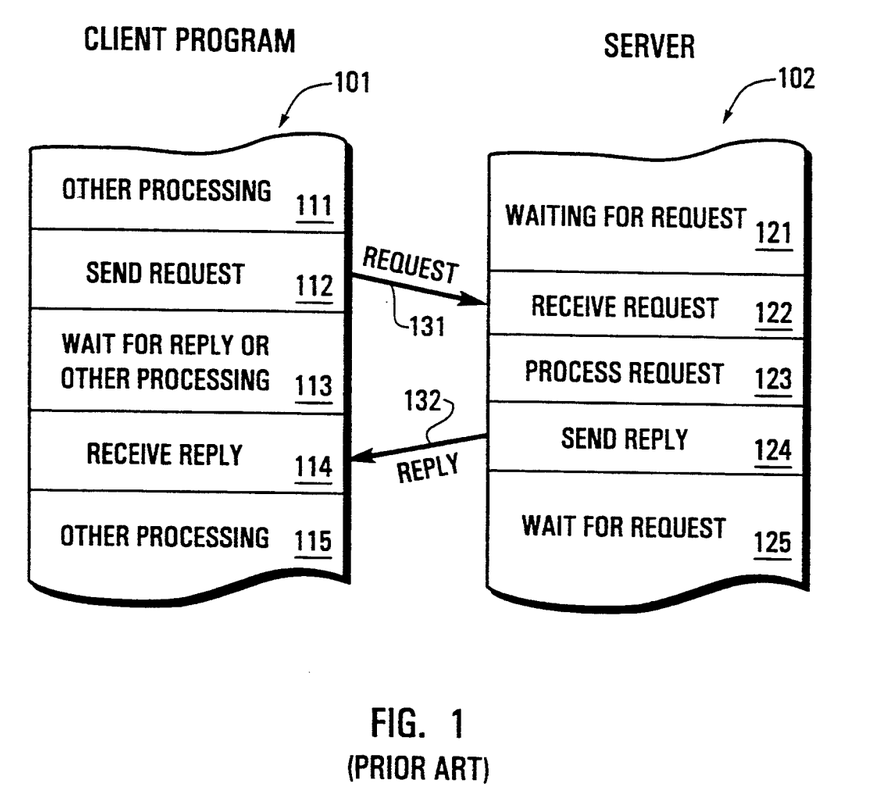
FIG. 1 is a simplified illustration of the communications and sequence of processing for a prior art client-server distributed system, and was discussed previously.

The use of data communications techniques to permit the distribution of data processing across a number of different digital computers is well known in the art. One of the most common organizations for such distributed systems follows the client-server model, where the distributed system has one or more servers assigned particular data processing tasks, and those servers are accessed by client programs whenever the particular data processing task of a server is required. Client programs access servers by sending a request message using an appropriate digital data communications system. Following the receipt of the request message, a server performs the data processing activity indicated by the request message to produce the desired result and sends a reply message containing the results back to the client program. The flow for such processing in a client-server distributed system is illustrated in FIG. 1. Initially, client program 101 is in step 111 performing other processing and server 102 is in step 121 waiting for a request. When client program 101 determines that it needs the processing of server 102, it prepares and sends such a request (step 112). The transfer of the request message from client program 101 to server 102 is indicated by arrow 131 in FIG. 1. Client program 101 then enters its step 113, where it either waits for a reply from server 102 or performs other processing. When request message 131 is received by server 102, it enters step 122 to receive the message and when the message has been completely received enters step 123 to process the request.

Figure 2A:
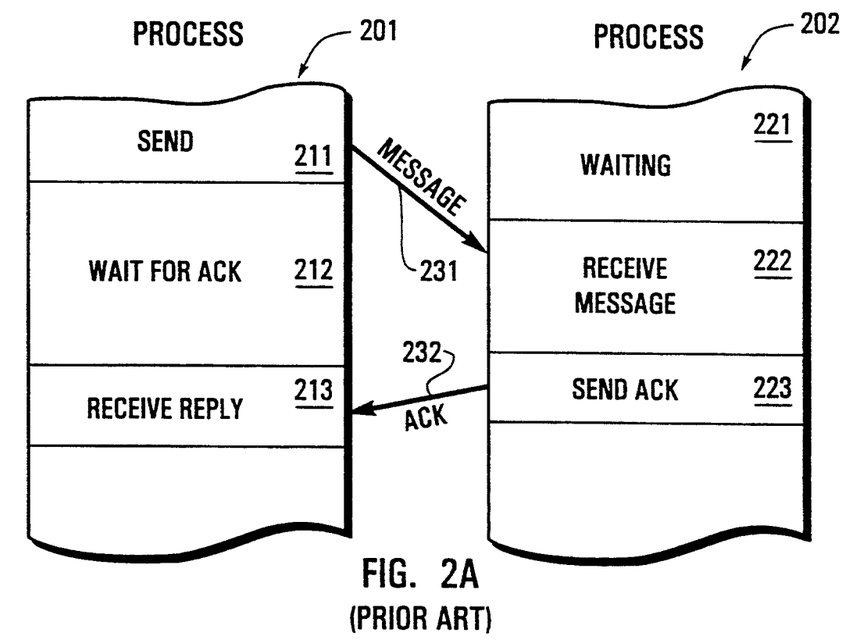
Figure 2B:
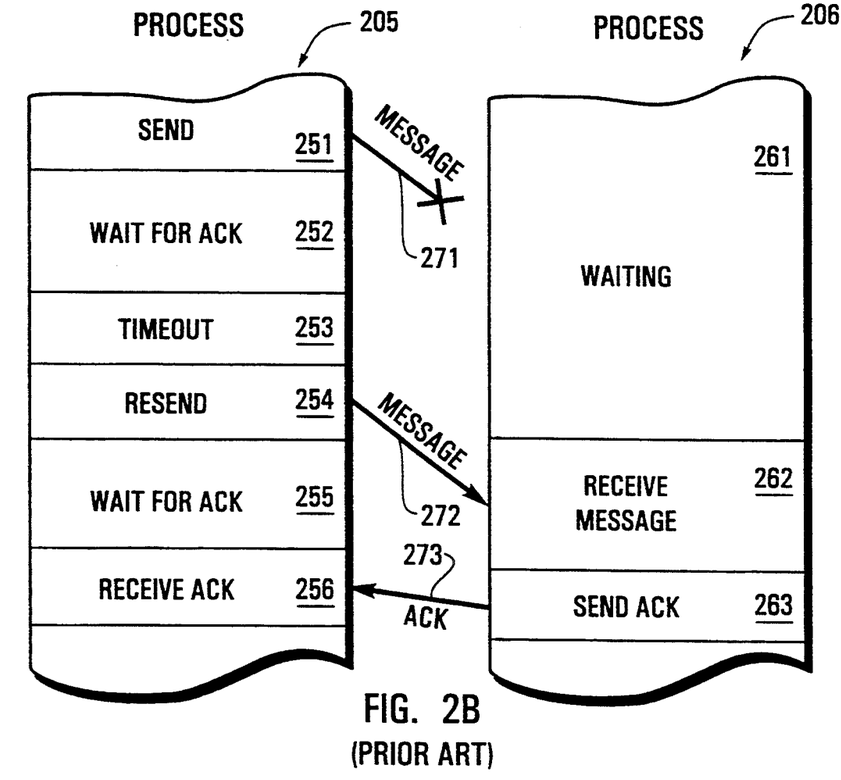

When server 102 has finished processing the request, it goes to step 124 where it sends reply message 132 to client program 101, and then enters step 125 where it waits for another request message. Client program 101 receives reply message 132 in step 114 and then proceeds to step 115, where it performs other processing. A simplified communications between client program 101 and server 102 was illustrated by messages 131 and 132 in FIG. 1. In particular, no provision was illustrated for handling the common problems in distributed processing: the loss of a data communications message or the failure of a server while processing a request. FIGS. 2A and 2B illustrate a well-known technique for handling such common problems. It is based on receiving an acknowledgement message (commonly called an ACK) for each message sent.

FIG. 2A shows the normal operation of the error recovery technique. It illustrates the steps for Process 201 sending a message to Process 202. In step 211 Process 201 sends message 231 to Process 202 and then enters step 212 waiting for an ACK. Process 202 is initially waiting in step 221 and enters step 222 when message 231 is received. After message 231 is completely received by Process 202, step 223 is entered to send an ACK message 232 back to Process 201. ACK 232 is received by Process 201 in step 213, indicating that message 231 was received by Process 202.

FIG. 2B shows how the error recovery technique handles a message being lost during its transmission. As in FIG. 2A, the example starts by Process 205 sending message 271 from step 251 and then enters step 252 waiting for an ACK. However, in the example in FIG. 2B message 271 is dropped and does not reach Process 206. Process 205 remains in step 252 waiting for an ACK (which will never come) until a predefined time period elapses, at which time Process 205 enters step 253 because of the timeout, and then enters step 254 where message 271 is resent to Process 206 as message 272. Message 272 is received by Process 206 in step 262, and Process 206 sends ACK 273 to Process 205 in step 263. This is received by Process 205 in step 256, completing the successful transfer of the message even after message 271 was dropped. Often a counter is employed so that only a specified number of retries will be attempted before deciding that a server cannot be accessed. When this occurs, it may be possible to locate an alternative server providing the same capabilities and attempt to access that alternative server.

While FIG. 2B indicates how error recovery occurs when message 271 is dropped, it can be readily seen how the same error recovery technique can produce the same result if a server fails after it receives a request but before it sends the ACK, if the ACK message is dropped, if a server fails during processing or before it sends its reply, or if the reply is dropped.

The case where the reply is sent by the server but is dropped and not received by the client presents a particular problem in that the server receives two identical requests and processes both of them. This is not a problem if a server operation is idempotent (can be repeated with no undesirable effects or giving identical results), as would be the case when the request to a server would be to read a particular block in a file. However, if the requested operation were something like doubling a particular value stored by a server, the result would be doubling the value twice (once for each request received), giving an improper result. Techniques are known in the art for handling errors when a server operation is not idempotent, such as recognizing that the multiple messages are the same through the use of unique identifiers and not performing an operation if its requesting message has already been seen.

Often it is necessary that a client employ a plurality of servers in order to produce its desired result. For example, in an information retrieval system the client may first call a parsing server that converts a query into a form needed for future processing. The parsed result is then passed to an index server that determines documents that possibly match the query. The list of possibly-matching documents is then passed to a searching server, where each document is examined to determine if it matches the original query.

Figure 3A:
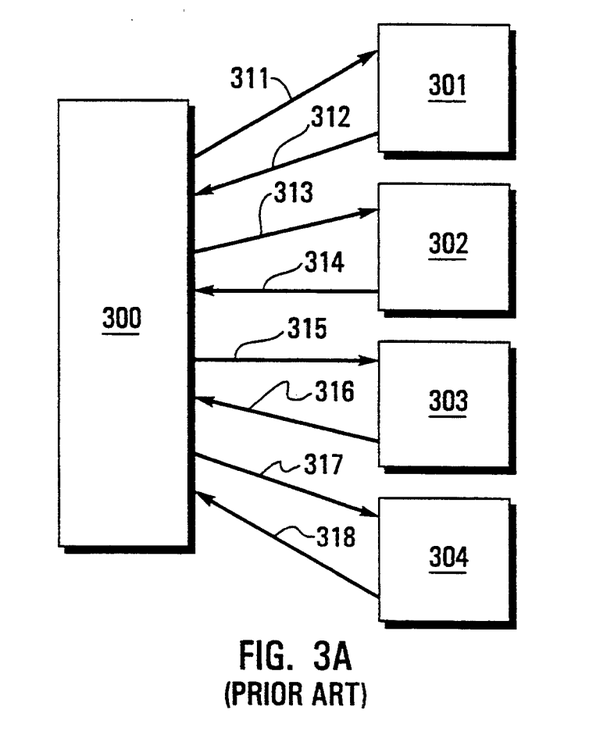
FIGS. 3A, 3B and 3C show three different ways from the prior art that a client and four servers can communicate, and was discussed previously.
Figure 3B:
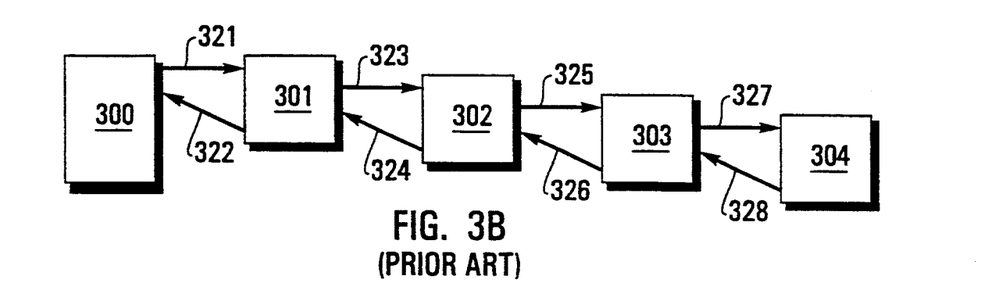
Figure 3C:
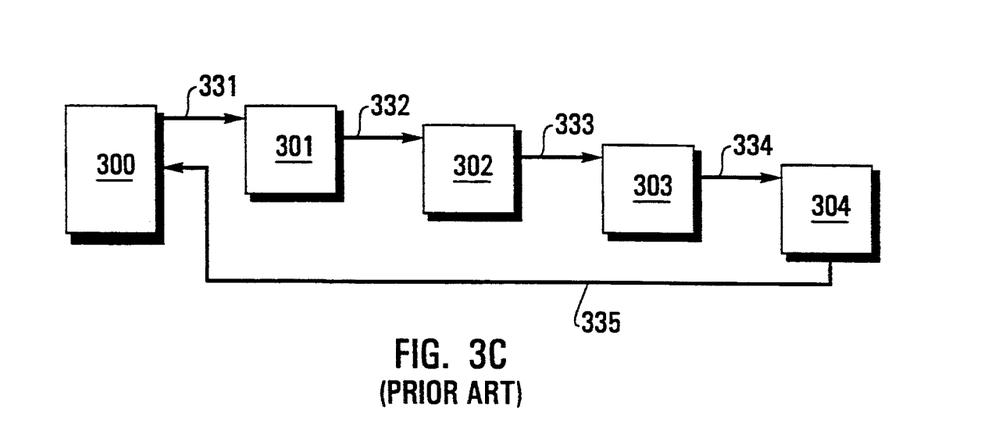

FIGS. 3A, 3B and 3C illustrate three different ways in the prior art that four servers 301, 302, 303, and 304 can act in cascade to process a client 300's request. In FIG. 3A, client 300 sequentially calls server 301, server 302, server 303, and server 304. In particular, client 300 first sends request message 311 to server 301 and receives reply 312. Client 301 then sends request message 313 (which may simply be a copy of reply 312) to server 302 and receives reply 314. Client 300 then sends request message 315 (possibly a copy of reply 314) to server 303 and receives reply 316. Finally, client 300 sends request message 317 (possibly a copy of 316) to server 304 and receives reply 318.

FIG. 3B illustrates an alternate flow for communications between client 300 and the four servers 301, 302, 303, and 304. In this example, client 300 first sends request message 321 to server 301. When server 301 completes its processing, it sends its results to server 302 as request 323 (rather than as a reply to client 300). When server 302 completes its processing, it sends its results to server 303 as request 325, and when server 303 completes its processing it sends its results to server 304 as request 327. When the final server 304 completes its processing, it sends its results as reply 328 to server 303. Server 303 receives reply 328 and sends a copy of it to server 302 as reply 326, server 302 receives reply 326 and sends a copy of it to server 301 as reply 324. Finally, server 301 receives reply 324 and sends a copy of it as the final reply 322 to client 300.

FIG. 3C illustrates a third flow for communications between client 300 and the four servers 301, 302, 303, and 304. In this example, client 300 first sends request message 331 to server 301. When server 301 completes its processing, it sends its results to server 302 as message 332; server 302 sends its results to server 303 as message 333; server 303 sends its results to server 304 as message 334. Finally, server 304 sends the final reply 335 to client 300. In essence, the four reply messages 328, 326, 324, and 322 in FIG. 3B are replaced by a single reply message 335 in FIG. 3C, eliminating the need for each server to copy and resend the reply messsages. This can result in a substantial savings in processing and communications bandwidth if the reply msssages are large.

The four cascaded servers illustrated in FIG. 3C represent one possible server configuration: a series cascade of servers. More complex server configurations are possible, including servers operating in parallel. Robert N. Elens, in his doctoral dissertation at the University of Utah, Sequencing Computational Events in Heterogeneous Distributed Systems (June 1990), describes a technique for dynamically controlling the sequencing and configuration of servers.

In the following discussion, it will be convenient to refer to the sequential relationship of servers (in other words, the ordering of the flow of processing through the servers). If server A sends its result to server B, server A is the predecessor of server B and server B is the successor of server A. In FIG. 3C, for example, server 302 is the predecessor of server 303 and the successor of server 301. Any server which comes after a particular server in a cascade of servers is a subsequent server of that server. For example, in FIG. 3C servers 302, 303, and 304 are subsequent servers of server 301.

The last server in a cascade is the final server. In FIG. 3C, server 304 is the final server. All other servers in a cascade are intermediate, servers. In FIG. 3C, servers 301, 302, and 303 are intermediate servers. In the following discussion, when the term "server" is used without a qualifier, it is synonymous with intermediate server.

If a server X is a subsequent server of server Y, and server Y is a subsequent server of server X, then server X and server Y are in a loop. It is unusual to find cascaded servers in a processing loop.

It is important to note that while the cascaded servers illustrated in FIG. 3C resemble a ring or loop as used in low-level data communications techniques (such as a token ring), they are quite different. In a ring communications system, any node can originate a message to be transferred through the other nodes until it reaches its destination node. To achieve this universal connectivity, it is necessary that the nodes of such a network be in a physical loop. In the cascaded server system illustrated in FIG. 3C, the processing flow originates at client 300 with request message 331, and ends when reply message 335 returns to client 300. What appears to be a loop or ring in FIG. 3C is broken by the presence of client 300, which does not transfer messages.

The concepts of a predecessor server, successor server, subsequent server, intermediate server, final server, and servers not in a processing loop all pertain to the flow of processing through the cascade of servers, and do not imply any particular structure of the underlying low-level data communications system. In particular, if processing flows from server R to server S, but not from server S to server R, server R and server S are not in a loop even though they may be connected by a ring network.

Error recovery is simple in the configuration illustrated in FIG. 3A. If there is either a communications failure between a server and client 300 or if a server fails before it can send its reply, a timeout as described above occurs and client 300 can resend the request to the appropriate server. If the server cannot be accessed, as indicated by more than a given number of retries being made, an attempt is made to locate an alternative server and send the request to that alternative server. These error recovery techniques are well known in the art of data communications systems and particularly client-server distributed systems.

Error recovery is considerably harder in the configurations illustrated in FIGS. 3B and 3C. A timeout in client 300 indicates that a failure has occurred in one of the servers or the various messages, but does not indicate the particular server or message causing the problem. It is necessary for client 300 to retry the entire operation, rather than simply retry the operation at the server that has failed. Because servers that have already successfully completed their processing must recompute their results, processing that should be unnecessary is required.

SUMMARY OF THE INVENTION

It is an object of the present invention to improve the error recovery in a digital communications system. In particular, it extends the simple error recovery technique illustrated in FIGS. 2A and 2B and described previously. It allows the use of the cascaded server configuration of FIG. 3C, with its reduction in processing and communications bandwidth over the configurations in FIGS. 3A and 3B, while in most cases eliminating the need for a client to completely restart a request to a cascade of servers. This reduces or eliminates the need for servers that have completed their processing to recompute their results.

The method of the present invention is to add an additional form of acknowledgement message from a server to its predecessor. This done message is sent when the server has completed all its processing and has received an ACK message from its successor, indicating that its result has been successfully received by the successor. The predecessor server retains a copy of its results until it receives the done message, at which time the copy of the results is discarded. If a done message is not received by the time a timer has expired, indicating that a problem has occurred with a server or its communications, the predecessor server resends its stored results.

These and other features of the invention will be more readily understood upon consideration of the attached drawings and of the following detailed description of those drawings and the presently preferred embodiments of the invention.

BRIEF DESCRIPTION OF THE DRAWINGS

FIGS. 2A and 2B are examples of a prior art error recovery technique. FIG. 2A shows normal operation, while FIG. 2B shows how error recovery occurs, and was discussed previously.

DETAILED DESCRIPTION OF THE INVENTION

In the following discussion of the present invention and its presently preferred embodiment, the examples given will be simplified by assuming that only a single request from a client is being processed at a given time. Each server will be in its idle step until it begins receiving a request and its receive step is entered. After the request has been received, the server's process step is entered and after processing has completed its send step is entered. After a series of steps particular to the present invention, the server reenters its idle step waiting for a new request.

In most practical situations, there will be a plurality of clients utilizing the servers. It is possible that the successor of a particular server will be determined dynamically based on the results of the server's processing (see, for example, the work of Elens previously cited). A particular server may handle only a single request at a time, giving the idle-receive-process-send-idle behavior just discussed, or may be capable of handling a plurality of requests simultaneously. This could be done by receiving requests as soon as they arrive at the server and adding each new request to a table of requests being currently processed. The server then divides its processing activity amongst the current requests. When all processing of a request has been completed, its results are sent to the appropriate successor server and it is removed from the table of requests being currently processed. These techniques for multiprocessing of a plurality of requests are well known in the art, and an embodiment of the present invention that utilizes such techniques does not depart from the scope or spirit of the present invention.

Figure 4:
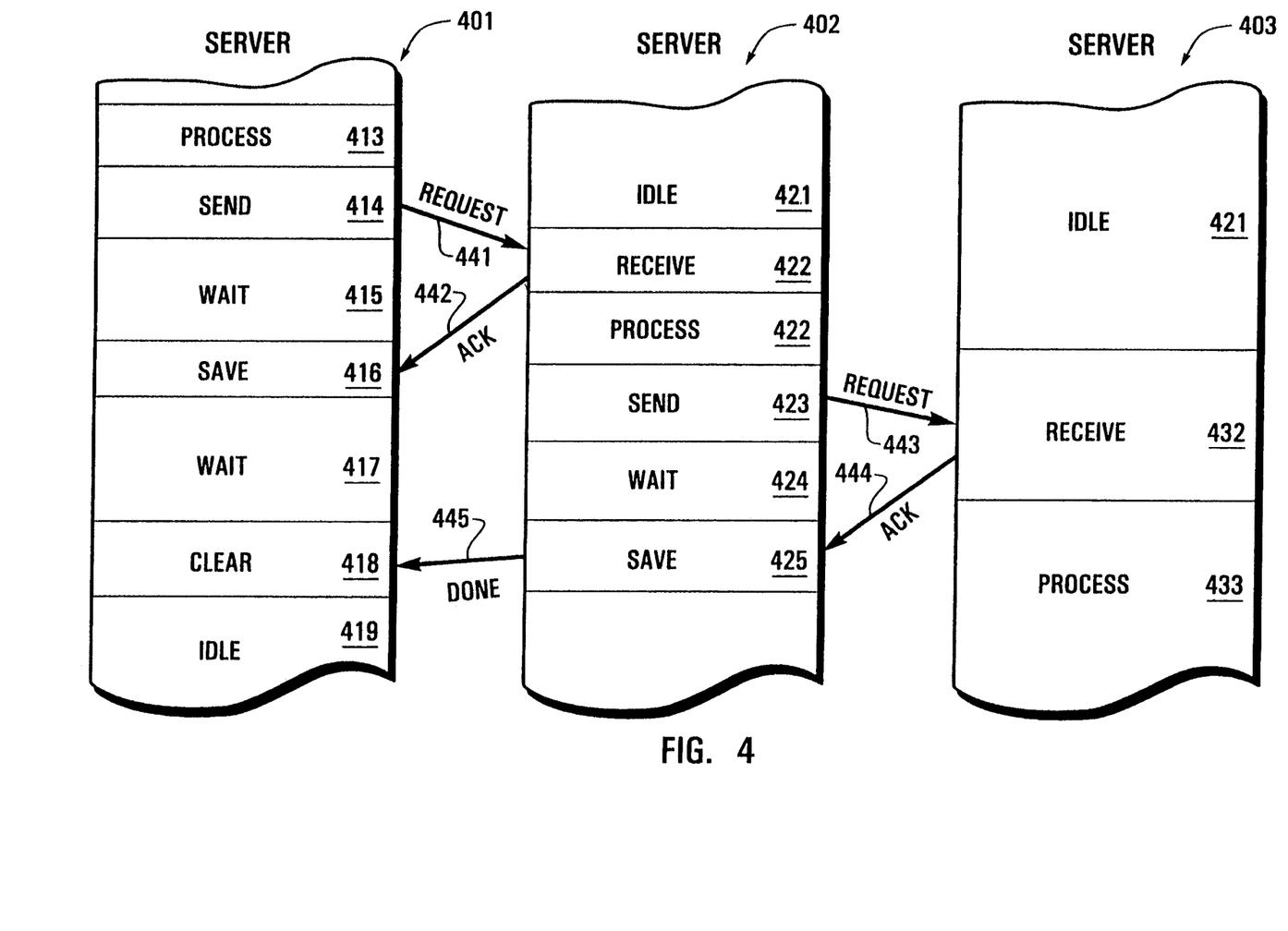
FIG. 4 depicts the flow of messages and processing for the present invention when no error recovery is necessary.

FIG. 4 depicts the flow of messages and processing for a simplified embodiment of the present invention when no error recovery is necessary. In FIG. 4, three cascaded servers 401, 402, and 403 are depicted. Server 402 is the successor to server 401 and the predecessor of server 403. The flow depicted in FIG. 4 begins with server 401 in step 413, completing the processing of a data processing task previously requested by its predecessor server, or the client program if server 401 is the first server in the cascade being used to process the request from the client. Server 402 is in its idle step 421 and server 403 is in its idle step 431, each waiting for a request to process.

After server 401 completes its process step 413 it enters send step 414, which sends a request message 441 to server 402, which causes server 402 to enter its receive step 422. After it completes sending request message 441, server 401 enters its wait step 415. When request message 441 has been received by server 402 without error, server 402 sends an ACK message 442 to server 401 and enters its process step 423.

When ACK message 442 arrives, server 401 leaves its wait step 415 and enters its save step 416. At this point, server 401 saves a copy of its results as sent in request message 441 to server 402, and then enters its wait step 417. When server 402 completes its process step 423, it enters its send step 424 to send its results as request message 443 to server 403. Server 402 then enters its wait step 425. Server 403 leaves its idle step 431, enters receive step 432, receives request message 443, sends ACK 444 to server 402, and enters its process step 433.

When ACK message 444 is received, server 402 enters its save step 426 and saves a copy of request message 443. Server 402 then sends a done message to server 401, indicating that it is no longer necessary for server 401 to save the copy of request message 441 that was saved in save step 416. Clear step 418 performs the processing to clear the copy of request message 441. Server 401 now enters its idle step 419, waiting for the next request message to arrive from a client or predecessor server.

In this simplified embodiment of the present invention, no actual processing is necessary for the saving and clearing of a request message. The request message must already be stored in the memory system of the computer running the server s ending the request message in order for it to be sent. All that is necessary for saving the request message is to assure that it is not overwritten by any other data until the clear step for the server is entered. Between the time the request message is sent and the clear step is entered the server is only in its save or wait steps. These steps do not require the overwriting of the request message.

In the presently preferred embodiment of this invention, a server does not have to wait for the done message from its successor before it can process its next request. Such waiting effectively adds the processing time of its successor server to the processing time of a server, dramatically reducing overall performance. To eliminate this problem, in the presently preferred embodiment a copy of the request message is saved in the holding area in the memory of the computer running the server. Each request message saved in the holding area is identified by a unique identifier, chosen to assure that no other request message sent by the server will have the same unique identifier. Such unique identifier could be a timestamp indicating when the request message was first sent to the successor server, or could be a unique code initially assigned by a client when it sends its request to the first server processing the request. The unique identifier is also included in the request message sent to the successor server. Also saved with the request message is a code that indicates the server to which the request message was sent. Finally, a timer is started that will indicate when the timeout period for the request message has expired.

Figure 5:
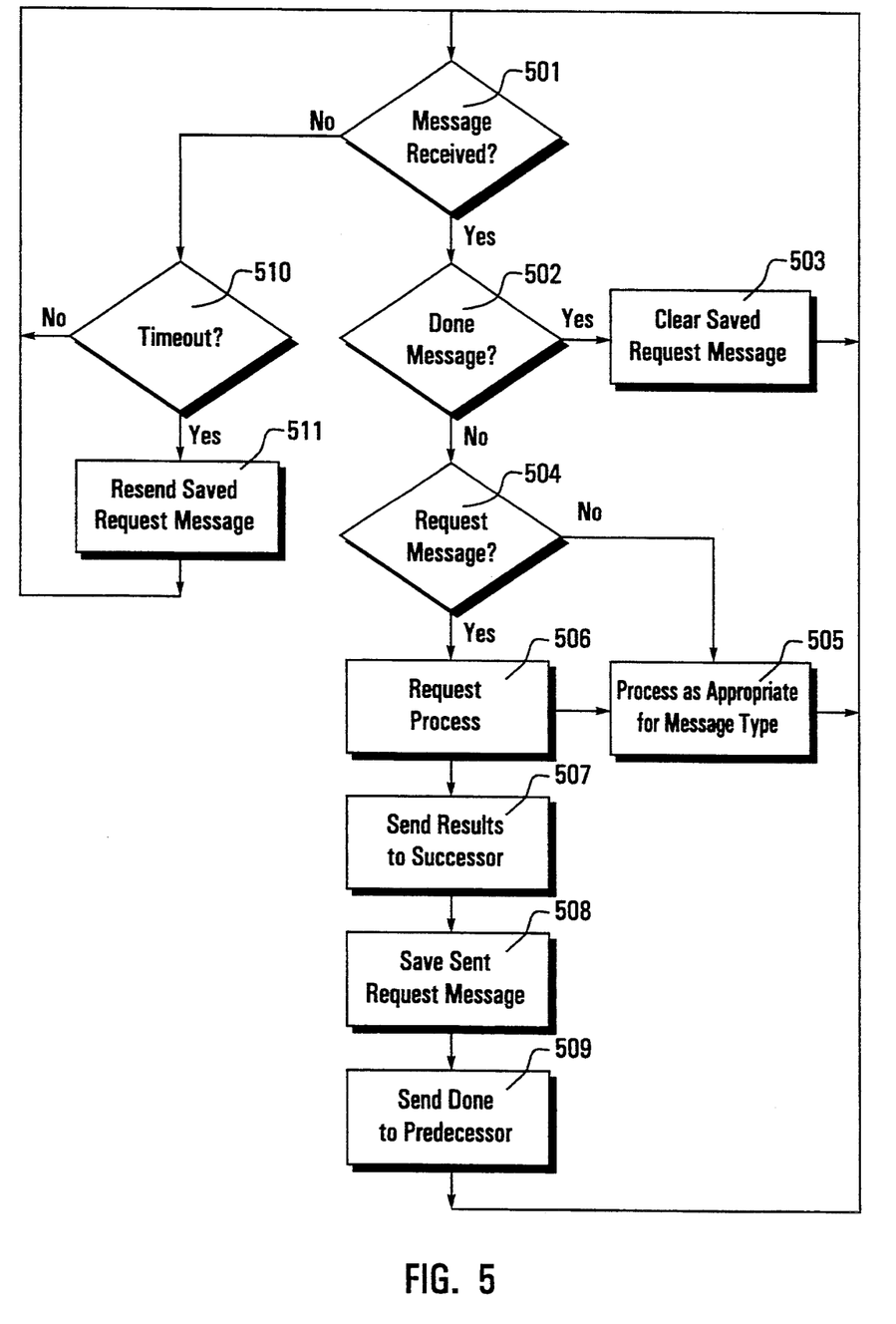
FIG. 5 is a flow diagram showing a portion of the processing of a server in the presently preferred embodiment.

FIG. 5 is a flow diagram illustrating a portion of the major processing steps in a server in the presently preferred embodiment of the present invention. Processing starts in step 501, where the server tests to see if a message has been received. When a message is received, the server tests to see if the message is a done message from a successor server (tested in step 502) or request message from a client or predecessor server (tested in step 504). If it is neither type of message, the server performs the processing necessary for the particular message type, to be discussed more fully below as part of the discussion of FIG. 8.

Processing for a request message comprises processing the request (in step 506), sending the results of that processing to the successor server (in step 507), and saving the request message that was sent to the successor server identified by its unique identifier (in step 508), and sending a done message to the server's predecessor (in step 509). Processing for a done message comprises clearing the saved request message whose unique indentifier corresponds to the unique identifier contained in the done message from the holding area containing saved request messages (step 503). (In general, correspondence between two unique indentifiers means that they are equal or identical, but any other comparison technique can be used without departing from the scope of the invention. )

The timer associated with the saved request message that has been cleared is also reset so that a false timeout indication will not result. As can be readily seen, this processing flow eliminates the need for a server to be waiting until it receives a done message from its successor server before it can process a new request.

If a message has not been received at the test in step 501, step 510 is used to see whether a timeout has occurred for any of the request messages that have been saved in step 508. If none have timed out, control returns to step 501 to determine if there has been a message received. If a timeout has occurred for one or more saved request messages, step 511 resends request messages corresponding to the saved request messages that have timed out to the appropriate servers. Step 511 also restarts the timer for the saved request message that has been resent.

The particular means for implementing the timeout for saved request messages depends on the facilities provided by the operating system for the digital computer on which the server is running. In some cases, it may be possible to set a timer for each saved message that causes an interrupt when it expires. The interrupt routine activated when the timer associated with a particular saved request message then resends that saved request message and reinitializes the timer to interrupt after another timeout period. In this case, the test of step 510 is implicitly done by the operating system as part of its timer management support and step 511 is the interrupt routine associated with the timer.

If the operating system only permits a single timer interrupt for a process, then the server must examine the time remaining before timeout for each saved request message and set the timer to generate an interrupt when the shortest time remaining occurs. In this case, the timeout interrupt must determine which saved request messages have timed out and also determine which will time out next and reset the timer to that value.

If the operating system provides a synchronous message waiting technique such as the SELECT feature of the Unix operating system as implemented in recently Berkeley releases, the tests of steps 501 and 510 can be combined into a single operating system call that relinquishes control of the processor by the server until either a message has been received or a timeout has occurred. It is then possible to determine from the return code of the SELECT call whether to go to step 502 (because a message has been received) or step 511 (because a timeout has occurred). Because the SELECT call provides for only a single timeout value, it is necessary to use a processing technique as was described above for the case when there is only a single timer interrupt. This means that the timeout used for the SELECT call is always the shortest time remaining before the timeout of any saved request message.

Figure 6:
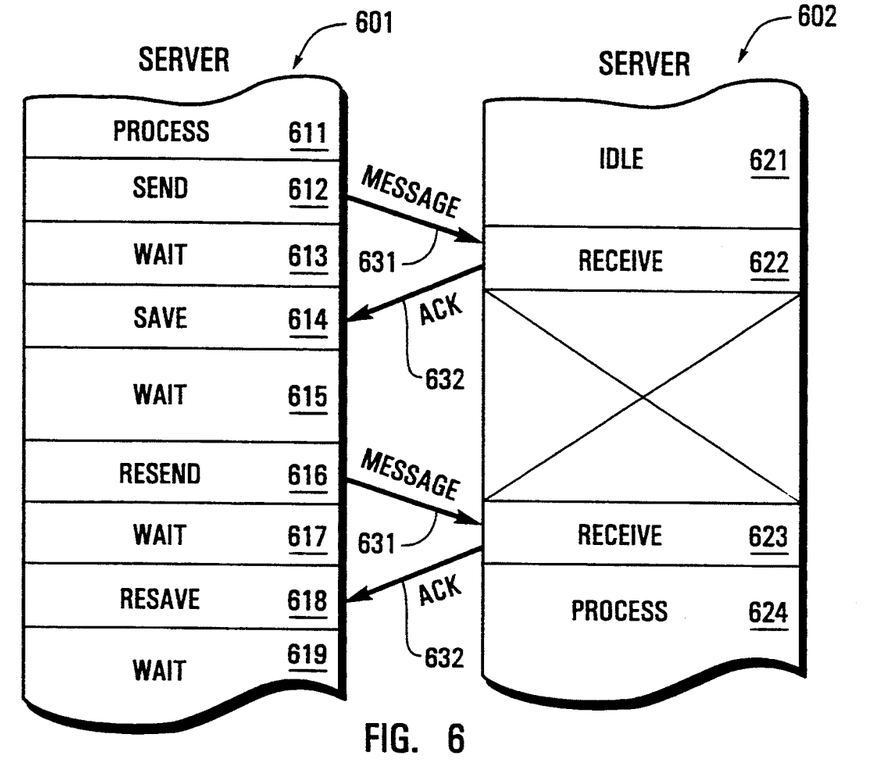
FIG. 6 depicts how the present invention recovers from errors.

FIG. 6 depicts how the present invention recovers from errors. Server 601 completes its process step 611 and enters its send step 612, which sends request message 631 to server 602. Server 602 leaves its idle step 621, receives request message 631 in receive step 622, and sends ACK 632 to server 601. Server 601 leaves wait step 613 and enters save step 614 when ACK 632 arrives. It then enters wait step 615, waiting for a done message to arrive from server 601. Up until this point, the processing is identical to that depicted in FIG. 4 and discussed above.

In this example, however, a problem occurs after request message 631 has been received by server 602 and ACK 632 is sent. Possible problems include a failure of server 602 during the processing of the request or a communications problem that prevents the delivery of a done message from server 602 to server 601. In any case, no done message arrives at server 601. Associated with wait step 615 is a timeout whose value is larger than the time necessary for the successor server to complete its processing and send its done message. Since the problem in this example means that no done message will be received, the timeout for wait step 615 and server 601 will enter resend step 616, where it will send a copy of saved request message 631 as request message 633. Server 602 receives request message 633 in receive step 623, sends ACK 634 to server 601, and enters process step 624. Server 601 leaves wait step 617 when ACK 634 is received, and enters resave step 618 to continue saving a copy of request message 631. It then enters wait step 619 and waits for either a done message from server 602 or another timeout indicating a continuing problem with server 602 or the communications path. If a done message is finally received, the saved copy of request message 631 is cleared as in the example of FIG. 4 above.

If no done message from server 602 is received, after a predefined number of timeouts and resends server 601 determines that a permanent problem exists with server 602 and either abandons the operation or attempts to find an alternative server that can perform the same operation as server 602. The particular action taken depends on the overall structure of the distributed system, and is beyond the scope of the present invention.

It is important to note that more than one copy of a request message will be received by a server if its predecessor server does not receive a done message and resends the request message. As was discussed previously, this presents no problem if the requested server operation is idempotent. If the requested operation is not idempotent, techniques well known in the art can be used to minimize any problems that might be caused by the occurrence of duplicate request messages.

One possible condition causing duplicate request messages to occur is if server 602 sends its done message so that it is received after server 601 sends request message 633. In this case, server 601 will receive a done message rather than the expected ACK 634. In addition, server 602 may view the resent request message 633 as a new request. There are a number of possible ways for treating this situation. One technique would be for server 601 to ignore the unexpected done message and wait for ACK 634, and to have server 602 acknowledge the resent request message 633. Server 602 can then either perform the processing requested in request message 633 again, or can recognize that it has already performed the processing and simply send a done message to server 601, thereby completing the operation.

The technique of the presently preferred embodiment is for server 601 to recognize the done message as pertaining to the original request message 631 and know that the resent request message 633 was unnecessary. This determination can be made by having all request messages contain an additional information field that indicates whether it is an original request message (like request message 631) or a resent request message (like request message 633). Each done or ACK message returned by the successor server contains the contents of this additional information field so that the server initiating the request can determine whether the done message pertains to the original or the resent request message. In addition, in the technique of the presently preferred embodiment if server 602 recognizes that request message 633 is a duplicate of a request message that it has already processed (in this case, request message 631), rather than acknowledge it with ACK 634 and perform the requested processing, it sends a negative acknowledge message to resent request message 633, indicating that the request is rejected because it duplicates a previous request message.

Despite such processing techniques, it still may be possible for duplicate requests to occur in the system. Their ultimate result is for the client to receive more than one response to its request (although all responses should be identical). The client will be able to readily determine when the first response to its request has been received, and will ignore any duplicate responses received after the first response.

As was discussed above, there is a timeout associated with the wait between saving a copy of a request message and receiving its associated done message. If the done message is not received before the timeout period expires, the request message is resent. A critical system parameter is the value of this timeout. If too large a value is selected, there will be an unnecessarily long wait before resending the request message, reducing overall system performance. However, if too small a value is selected, timeouts will occur if the processing of the request by the successor server is delayed even slightly, resulting in the unnecessary resending of request messages. This will also reduce overall system performance.

Figure 7:
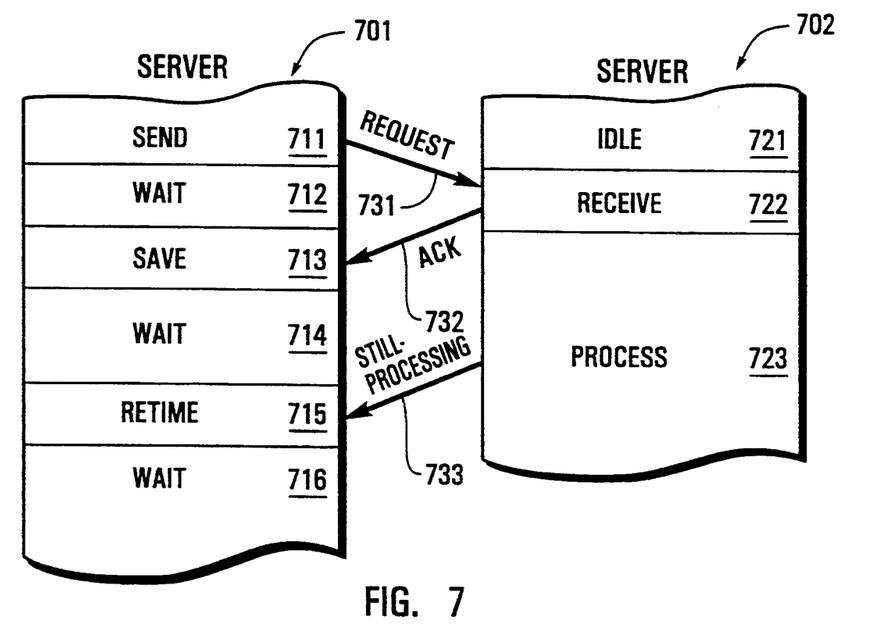
FIG. 7 depicts an optional feature of the present invention that permits the use of shorter timeout periods.

FIG. 7 depicts a feature of the presently preferred embodiment that permits the use of shorter timeout periods. Processing is the same as in the previous examples through server 701's wait step 714 and server 702's receive step 722. However, server 702's process step 723 has been modified to send a still-processing message 733 if the processing time in the step has exceeded a predetermined value selected to be somewhat less than the timeout value for server 701's wait step 714. When server 701 receives still-processing message 733, it resets its timeout value in retiree step 715 and enters wait step 716, waiting for a done message or another still-processing message from server 702, or the expiration of the reset timeout that indicates a problem with either server 702 or the communications between servers 701 and 702. This permits the use of a timeout that is close to the processing time for server 702, while preventing unnecessary timeouts if there is a delay in server 702's processing.

In the presently preferred embodiment of this invention, a further feature is for the successor server to return an initial processing time estimate to the server sending the request message as part of the ACK to the request message. This time estimate then becomes the initial value for the timeout. If the successor server later determines that its time estimate was too low, it sends a still-processing message to the server that sent the request message indicating a new estimate to use for the timeout.

Figure 8:
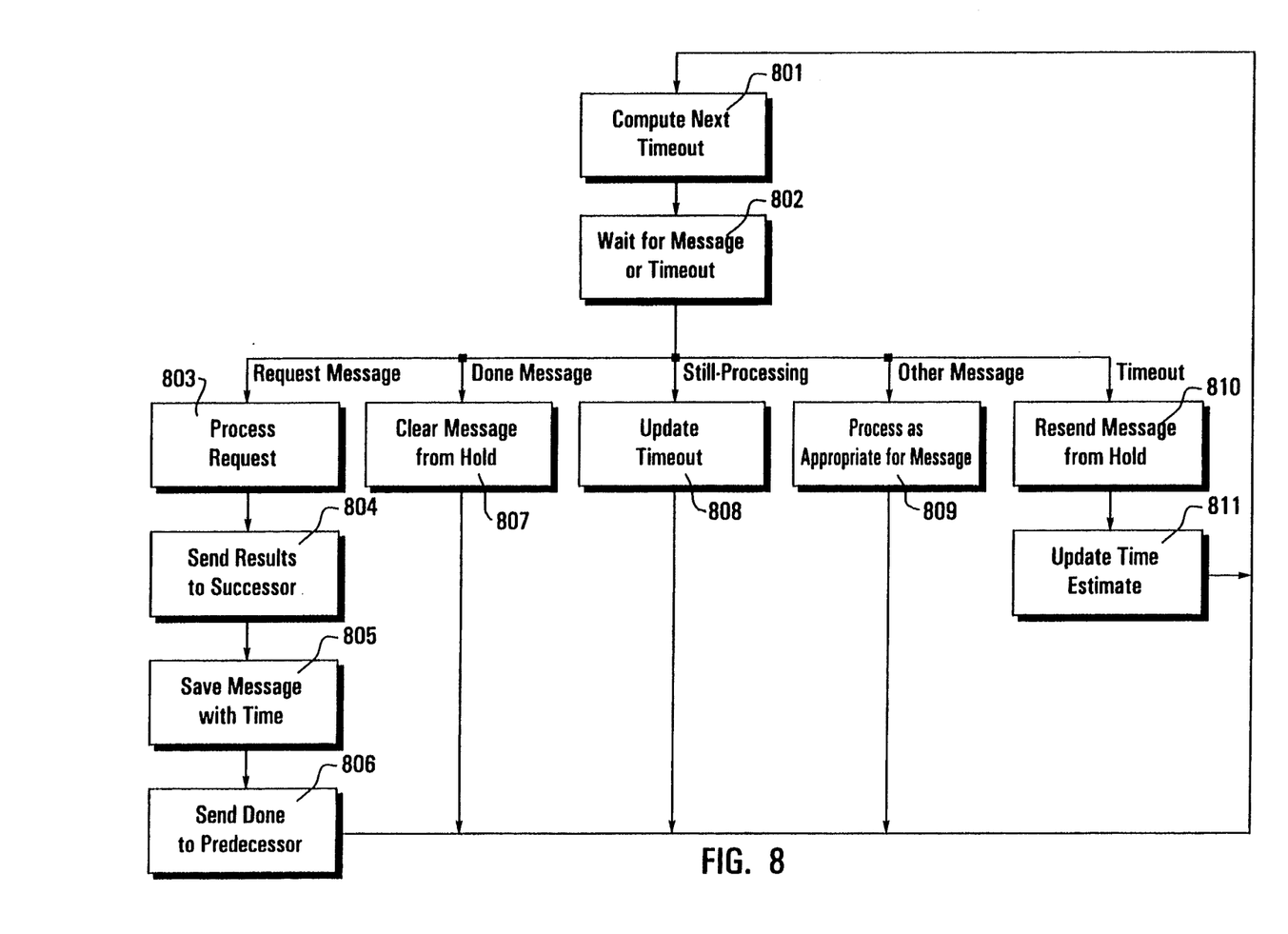
FIG. 8 is a flow diagram showing the processing of a server in the presently preferred embodiment.

FIG. 8 is a flow diagram showing the processing of a server in the presently preferred embodiment. Processing begins in step 801, where the time until the next timeout for any message stored in the holding memory is computed. Since when the server is first started there are no messages stored in the holding area, a timeout value is selected that inhibits timeouts. (The particular value depends on the nature of the timer support for the particular operating system on which the server is running, but will be known to someone familiar with the operating system.) The presently preferred embodiment then enters step 802, where it waits for either a message to arrive from a client or another server or for a timeout caused by the expiration of the time computed in step 801.

There are five mutually exclusive reasons why the wait in step 802 completes: the receipt of a request message, receipt of a done message, receipt of a still-processing message, receipt some other message whose type is immaterial to the present invention, or a timeout. If a request message is received, step 803 is entered to process the request. Control then passes to step 804 to send the results of the processing as a request to the successor server of the server and receive a processing time estimate as part of the ACK from the successor server. In step 805 a copy of the request sent to the successor is saved in the holding area, along with information about the network address of the successor server and the time when the successor server estimated it would complete its processing of the request. Finally, in step 806 a done message is sent to the predecessor of the server. Control then passes to step 801, where the amount of time before the first timeout for any message in the holding area is computed.

It is important to note that if the successor to the server is not another server, but is the client that originated the request, it is not necessary to save a copy of the message containing the results in the holding area nor wait for a done message or a timeout causing the resending of the results. When the ACK to the message sending the results to the client has been received by the server, it is assured that the client has received the result of its requested processing and it will not longer be necessary for a server to resend its results to a successor server in the case of a failure.

If a done message has been received, step 807 is entered and the saved copy of the request message indicated by the unique identifier in the done message is removed from the holding area. If a still-processing message is received, step 808 is entered and the expected completion time for the saved message indicated by the unique identifier in the still-processing message is updated. If any other message is received, the appropriate processing is performed in step 809. (Any other messages are not pertinent to the present invention, and their particular processing is not discussed here.) Control then passes from steps 807, 808, or 809 to step 801, where the amount of time before the first timeout for any message in the holding area is computed.

If step 810 is entered because of the wait in step 802 ending due to a timeout, the message or messages whose time estimates have expired are determined and the message or messages are resent to the appropriate successor server or servers. The processing time estimate received from the successor server as part of the ACK message it sends when it receives the resent request message is used as the new time estimate for the saved message. Control then passes to step 801.

Figure 9:
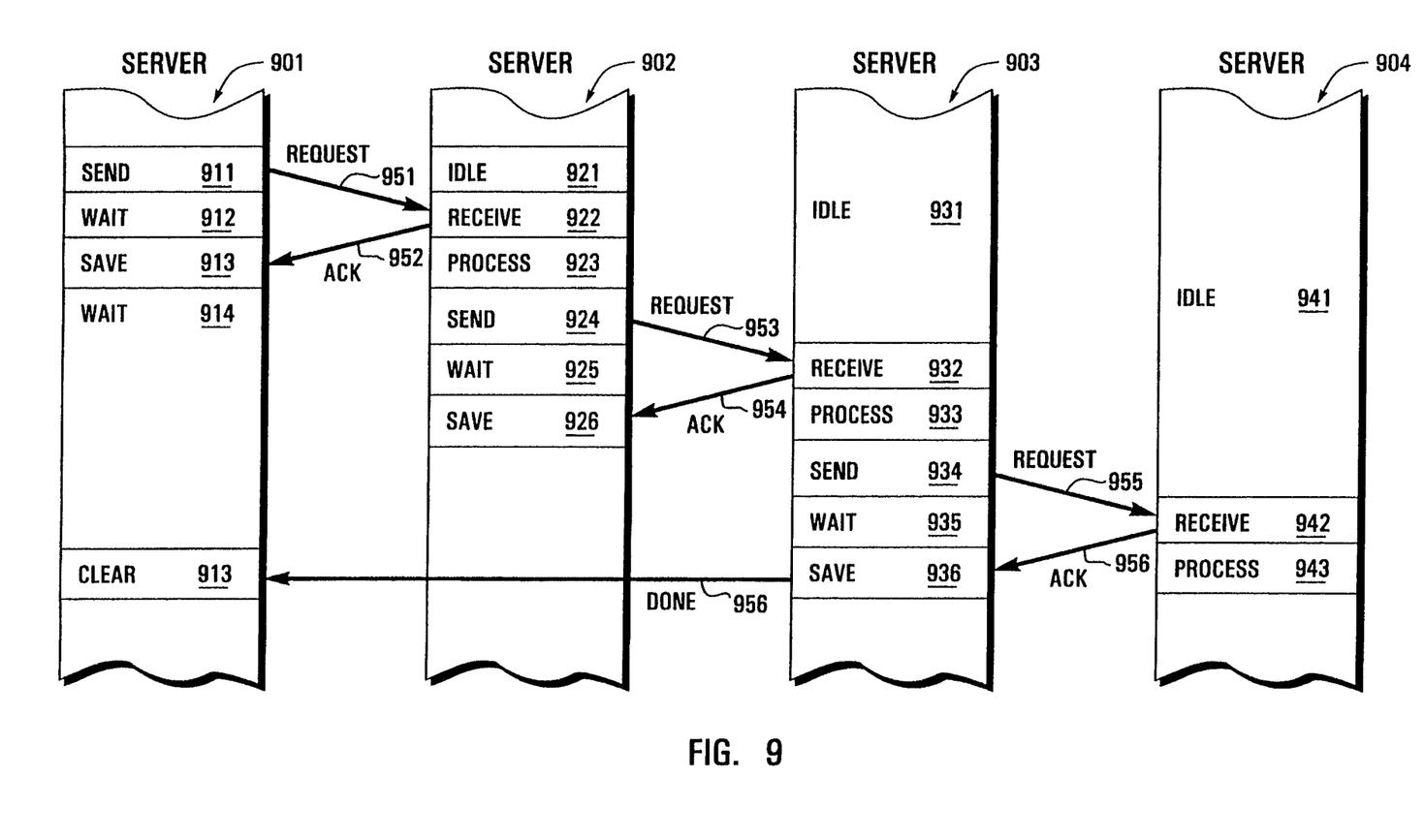
FIG. 9 depicts the flow of messages and processing for an alternative embodiment of the present invention.

FIG. 9 depicts the flow of messages and processing for an alternative embodiment of the present invention. In this example, there are four servers 901, 902, 903, and 904. The processing flow is identical to the example depicted in FIG. 4 and discussed previously until it reaches server 902's save step 926. In the embodiment illustrated by FIG. 4, at this point server 902 would send a done message to server 901. However, in the alternative embodiment illustrated by FIG. 9, that done message is not sent. Instead, done message 957 is sent to server 901 by server 903 when it enters its save step 934. This results in server 901 resending its request message to server 902 not only when there has been a problem with server 902's processing, but also if there has been a problem with server 902's sending of a request message to server 903, server 903 acknowledging the request message, server 903's processing of the request message, and the communications of the done message from server 903 to server 901. It is important to note that when the final result is received by the client that originated the request, that client must send done messages to all servers that have not received a done message from their subsequent servers. For example, if server 904 in FIG. 9 is the last server in the cascade and sends its results to the client, it will be necessary for the client to send done messages both to server 904 and server 903.

While this alternative embodiment permits the recovery from a wider range of errors, it is at the expense of a considerably longer timeout for server 901's wait step 914 and the need for server 901 to store a copy of request message 951 for a longer time, increasing server 901's holding memory requirements if the server can handle multiple requests using the processing technique that was illustrated in FIG. 8.

As seen in FIG. 9 and the previous discussion, the generation of the done message that causes a server to clear a previously saved request message does not need to come from that server's immediate successor server, but can come from any subsequent server to that server in the cascade of servers. In most cases, however, the method of the presently preferred embodiment as illustrated in FIGS. 4 and 8 provides recovery from a sufficient variety of errors, but the method illustrated in FIG. 9 may be desirable if either the servers or communications techniques are particularly unreliable.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is my intent they be deemed within the scope of our invention.

I claim:

1. A method for error recovery in a client-server distributed processing system using cascaded servers, said distributed processing system comprising:
   an intermediate server; and
   a successor server of said intermediate server, not in a processing loop with said intermediate server, the method comprising:
   said intermediate server saving a copy of a request message sent to said successor server; and
   if no done message has been received in a predetermined period of time, said intermediate server resending said request message to said successor server.

2. A method as in claim 1, wherein said request message specifies at least one task to be performed by said successor server, and said done message is sent by said successor server after said successor server has completed said at least one task.

3. A method as in claim 1, wherein said done message is sent by said successor server after said successor server has received an acknowledge message in response to a request message.

4. A method as in claim 1, wherein said request message includes a unique identifier and said done message includes a unique identifier corresponding to said request message's unique identifier.

5. A method as in claim 4, wherein said request message's unique identifier is a timestamp determined when said request message is first sent to said successor server.

6. A method as in claim 4, wherein said request message's unique identifier is a unique identifier assigned when a client first makes a request.

7. A method as in claim 1, wherein said predetermined period of time is indicated by a timer interrupt.

8. A method as in claim 1, wherein said predetermined period of time is indicated by completion of a synchronous wait operation.

9. A method as in claim 1, wherein said predetermined period of time is selected based on an expected completion time of said successor server.

10. A method as in claim 9, wherein said expected completion time of said successor server is contained in an acknowledgement message sent to said intermediate server from said successor server in response to said request message.

11. A method as in claim 10, wherein said successor server sends a still-processing message to said intermediate server if said successor server determines that said expected completion time is different than said successor server's new estimate of said completion time.

12. A method as in claim 1, wherein said resent request message includes a flag to indicate that it is a resent request message.

13. A method as in claim 12, wherein said successor server sends a negative acknowledge message to said intermediate server if said successor server receives a request message whose flag indicates it is a resent message, and said request message has already been processed.

14. A method for error recovery in a client-server distributed processing system using cascaded servers, said distributed processing system comprising:
   an intermediate server;
   a successor server of said intermediate server, not in a processing loop with said intermediate server; and
   a subsequent server of said intermediate server, the method comprising:
   said intermediate server saving a copy of a request message sent to said successor server; and
   if no done message has been received in a predetermined period of time, said intermediate server re-sending said request message to said successor server.

15. A method as in claim 14, wherein said request message specifies at least one task to be performed by said successor server, and said done message is sent by said subsequent server after said successor server has completed said at least one task.

16. A method as in claim 14, wherein said done message is sent by said subsequent server after said subsequent server has received an acknowledge message in response to a request message.

17. A method as in claim 14, wherein said request message includes a unique identifier and said done message includes a unique identifier corresponding to said request message's unique identifier.

18. A method as in claim 17, wherein said request message's unique identifier is a timestamp determined when said request message is first sent to said successor server.

19. A method as in claim 17, wherein said request message's unique identifier is a unique identifier assigned when a client first makes a request.

20. A method as in claim 14, wherein said predetermined period of time is indicated by a timer interrupt.

21. A method as in claim 14, wherein said predetermined period of time is indicated by completion of a synchronous wait operation.

22. A method as in claim 14, wherein said predetermined period of time is selected based on an expected completion time of said successor server.

23. A method as in claim 22, wherein said expected completion time of said successor server is contained in an acknowledgement message sent to said intermediate server from said successor server in response to said request message.

24. A method as in claim 23, wherein said successor server sends a still-processing message to said intermediate server if said successor server determines that said expected completion time is different than said successor server's new estimate of said completion time.

25. A method as in claim 14, wherein said resent request message includes a flag to indicate that it is a resent request message.

26. A method as in claim 25, wherein said successor server sends a negative acknowledge message to said intermediate server if said successor server receives a request message whose flag indicates it is a resent message, and said request message has already been processed.

27. A computer system providing error recovery for a client-server distributed processing system having a cascade of servers, comprising:
   an intermediate server computer having:
      a program implementing a server function,
      a memory means for storing information, and
      a timing means for determining whether a predetermined period of time has elapsed;
   a successor server computer, not in a processing loop with said intermediate server computer said successor server computer being a successor of said intermediate server computer in said cascade of servers and not in a processing loop with said intermediate server computer; and
   a data communications system, comprising means for sending messages from said intermediate server computer to said successor server computer and for sending messages from said successor server computer to said intermediate server computer,
   wherein said intermediate server computer sends a request message to said successor server computer using said data communications system;
   and wherein said intermediate server computer saves said request message in said memory means of said intermediate server computer;
   and wherein said intermediate server computer starts said timing means when said request message is sent to said successor server computer;
   and wherein said intermediate server computer resends said request message to said successor server computer if said done message has not been received before said timing means has determined whether said predetermined period of time has elapsed.

28. A system as in claim 27, wherein said request message specifies at least one task to be performed by said successor server computer, and said done message is sent by said successor server computer after said successor server computer has completed said at least one task.

29. A computer system providing error recovery for a client-server distributed processing system having a cascade of servers, comprising:
   an intermediate server computer having:
      a program implementing a server function,
      a memory means for storing information, and
      a timing means for determining whether a predetermined period of time has elapsed;
   a successor server computer, not in a processing loop with said intermediate server computer said successor server computer being a successor of said intermediate server computer in said cascade of servers and not in a processing loop with said intermediate server computer;
   a subsequent server computer having a program implementing a server function, said subsequent server computer being a subsequent server in said cascade of servers to said intermediate server computer; and
   a data communications system, comprising means for sending messages from said intermediate server computer to said successor server computer and further comprising means for sending messages from said subsequent server computer to said intermediate server computer, wherein said intermediate server computer sends a request message to said successor server computer using said data communications system;

and wherein said intermediate server computer saves said request message in said memory means of said intermediate server computer;

and wherein said intermediate server computer starts said timing means when said request message is sent to said successor server computer;

and wherein said intermediate server computer resends said request message to said successor server computer if said done message has not been received before said timing means has determined whether said predetermined period of time has elapsed.

30. A system as in claim 29, wherein said request message specifies at least one task to be performed by said successor server computer, and said done message is sent by said subsequent server computer after said successor server computer has completed said at least one task.

* * * * *